US010922234B2

(12) United States Patent
Li

(10) Patent No.: US 10,922,234 B2
(45) Date of Patent: Feb. 16, 2021

(54) METHOD AND SYSTEM FOR ONLINE RECOVERY OF LOGICAL-TO-PHYSICAL MAPPING TABLE AFFECTED BY NOISE SOURCES IN A SOLID STATE DRIVE

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 50 days.

(21) Appl. No.: 16/381,827

(22) Filed: Apr. 11, 2019

(65) Prior Publication Data

US 2020/0327066 A1 Oct. 15, 2020

(51) Int. Cl.
*G06F 12/0891* (2016.01)
*G06F 12/02* (2006.01)
(Continued)

(52) U.S. Cl.
CPC .......... *G06F 12/0891* (2013.01); *G06F 3/061* (2013.01); *G06F 3/064* (2013.01);
(Continued)

(58) Field of Classification Search
CPC . G06F 12/0246; G06F 12/0891; G06F 12/064
See application file for complete search history.

(56) References Cited

U.S. PATENT DOCUMENTS 3,893,071 A 7/1975 Bossen
4,718,067 A 1/1988 Peters
(Continued)

FOREIGN PATENT DOCUMENTS

JP 2003022209 1/2003
JP 2011175422 9/2011
(Continued)

OTHER PUBLICATIONS https://web.archive.org/web/20071130235034/http://en.wikipedia.org:80/wiki/logical_block_addressing wikipedia screen shot retriefed on wayback Nov 20, 2007 showing both physical and logical addressing used historically to access data on storage devices (Year: 2007).

(Continued)

*Primary Examiner* — Sean D Rossiter
(74) *Attorney, Agent, or Firm* — Shun Yao; Park, Vaughan, Fleming & Dowler LLP

(57) ABSTRACT

One embodiment facilitates error recovery. During operation, the system receives an input/output request indicating data associated with a first logical block address. The system detects, in a mapping table, an error associated with the first logical block address, wherein the mapping table maps logical block addresses to physical block addresses. The system identifies a dedicated block which stores log entries with logical block addresses corresponding to sequentially programmed physical blocks. The system performs a search in the dedicated block to obtain a most recent valid log entry for the first logical block address. The system obtains a first physical block address corresponding to the first logical block address based on the sequentially programmed physical blocks or the dedicated block. The system executes the I/O request by accessing the first physical block address.

18 Claims, 10 Drawing Sheets

(51) Int. Cl.
  *G06F 3/06* (2006.01)
  *G06F 12/06* (2006.01)
(52) U.S. Cl.
  CPC ........ *G06F 3/0679* (2013.01); *G06F 12/0246* (2013.01); *G06F 12/063* (2013.01)

(56) References Cited

U.S. PATENT DOCUMENTS

| | | | |
|---|---|---|---|
| 4,775,932 | A | 10/1988 | Oxley |
| 5,394,382 | A | 2/1995 | Hu |
| 5,732,093 | A | 3/1998 | Huang |
| 5,802,551 | A | 9/1998 | Komatsu |
| 5,930,167 | A | 7/1999 | Lee |
| 6,098,185 | A | 8/2000 | Wilson |
| 6,148,377 | A | 11/2000 | Carter |
| 6,226,650 | B1 | 5/2001 | Mahajan et al. |
| 6,243,795 | B1 | 6/2001 | Yang |
| 6,457,104 | B1 | 9/2002 | Tremaine |
| 6,658,478 | B1 | 12/2003 | Singhal |
| 7,351,072 | B2 | 4/2008 | Muff |
| 7,565,454 | B2 | 7/2009 | Zuberi |
| 7,599,139 | B1 | 10/2009 | Bombet |
| 7,953,899 | B1 | 5/2011 | Hooper |
| 7,958,433 | B1 | 6/2011 | Yoon |
| 8,085,569 | B2 | 12/2011 | Kim |
| 8,144,512 | B2 | 3/2012 | Huang |
| 8,166,233 | B2 | 4/2012 | Schibilla |
| 8,260,924 | B2 | 9/2012 | Koretz |
| 8,281,061 | B2 | 10/2012 | Radke |
| 8,452,819 | B1 | 5/2013 | Sorenson, III |
| 8,516,284 | B2 | 8/2013 | Chan |
| 8,751,763 | B1 | 6/2014 | Ramarao |
| 8,825,937 | B2 | 9/2014 | Atkisson |
| 8,868,825 | B1 | 10/2014 | Hayes |
| 8,904,061 | B1 | 12/2014 | O'Brien, III |
| 8,949,208 | B1 | 2/2015 | Xu |
| 9,015,561 | B1 | 4/2015 | Hu |
| 9,043,545 | B2 | 5/2015 | Kimmel |
| 9,088,300 | B1 | 7/2015 | Chen |
| 9,092,223 | B1 | 7/2015 | Pani |
| 9,129,628 | B1 | 9/2015 | Fallone |
| 9,280,472 | B1 | 3/2016 | Dang |
| 9,280,487 | B2 | 3/2016 | Candelaria |
| 9,336,340 | B1 | 5/2016 | Dong |
| 9,436,595 | B1 | 9/2016 | Benitez |
| 9,529,601 | B1 | 12/2016 | Dharmadhikari |
| 9,588,698 | B1 | 3/2017 | Karamcheti |
| 9,588,977 | B1 | 3/2017 | Wang |
| 9,747,202 | B1 | 8/2017 | Shaharabany |
| 9,852,076 | B1 | 12/2017 | Garg |
| 9,875,053 | B2 | 1/2018 | Frid |
| 10,013,169 | B2 | 7/2018 | Fisher |
| 10,199,066 | B1 | 2/2019 | Feldman |
| 10,229,735 | B1 | 3/2019 | Natarajan |
| 10,235,198 | B2 | 3/2019 | Qiu |
| 10,318,467 | B2 | 6/2019 | Barzik |
| 10,437,670 | B1 | 10/2019 | Koltsidas |
| 10,649,657 | B2 | 5/2020 | Zaidman |
| 2001/0032324 | A1 | 10/2001 | Slaughter |
| 2002/0010783 | A1 | 1/2002 | Primak |
| 2002/0073358 | A1 | 6/2002 | Atkinson |
| 2002/0095403 | A1 | 7/2002 | Chandrasekaran |
| 2002/0161890 | A1 | 10/2002 | Chen |
| 2003/0074319 | A1 | 4/2003 | Jaquette |
| 2003/0145274 | A1 | 7/2003 | Hwang |
| 2003/0163594 | A1 | 8/2003 | Aasheim |
| 2003/0163633 | A1 | 8/2003 | Aasheim |
| 2003/0217080 | A1 | 11/2003 | White |
| 2004/0010545 | A1 | 1/2004 | Pandya |
| 2004/0066741 | A1 | 4/2004 | Dinker |
| 2004/0103238 | A1 | 5/2004 | Avraham |
| 2004/0143718 | A1 | 7/2004 | Chen |
| 2004/0255171 | A1 | 12/2004 | Zimmer |
| 2004/0268278 | A1 | 12/2004 | Hoberman |
| 2005/0038954 | A1 | 2/2005 | Saliba |
| 2005/0097126 | A1 | 5/2005 | Cabrera |
| 2005/0177672 | A1 | 8/2005 | Rao |
| 2005/0177755 | A1 | 8/2005 | Fung |
| 2005/0195635 | A1 | 9/2005 | Conley |
| 2005/0235067 | A1 | 10/2005 | Creta |
| 2005/0235171 | A1 | 10/2005 | Igari |
| 2006/0031709 | A1 | 2/2006 | Hiraiwa |
| 2006/0156012 | A1 | 7/2006 | Beeson |
| 2007/0033323 | A1 | 2/2007 | Gorobets |
| 2007/0061502 | A1 | 3/2007 | Lasser |
| 2007/0101096 | A1 | 5/2007 | Gorobets |
| 2007/0283081 | A1 | 12/2007 | Lasser |
| 2007/0285980 | A1 | 12/2007 | Shimizu |
| 2008/0034154 | A1 | 2/2008 | Lee |
| 2008/0065805 | A1 | 3/2008 | Wu |
| 2008/0082731 | A1 | 4/2008 | Karamcheti |
| 2008/0112238 | A1 | 5/2008 | Kim |
| 2008/0301532 | A1 | 12/2008 | Uchikawa |
| 2009/0089544 | A1 | 4/2009 | Liu |
| 2009/0113219 | A1 | 4/2009 | Aharonov |
| 2009/0282275 | A1 | 11/2009 | Yermalayeu |
| 2009/0287956 | A1 | 11/2009 | Flynn |
| 2009/0307249 | A1 | 12/2009 | Koifman |
| 2009/0310412 | A1 | 12/2009 | Jang |
| 2010/0031000 | A1 | 2/2010 | Flynn |
| 2010/0169470 | A1 | 7/2010 | Takashige |
| 2010/0217952 | A1 | 8/2010 | Iyer |
| 2010/0229224 | A1 | 9/2010 | Etchegoyen |
| 2010/0241848 | A1 | 9/2010 | Smith |
| 2010/0321999 | A1 | 12/2010 | Yoo |
| 2010/0325367 | A1 | 12/2010 | Kornegay |
| 2010/0332922 | A1 | 12/2010 | Chang |
| 2011/0055458 | A1 | 3/2011 | Kuehne |
| 2011/0055471 | A1 | 3/2011 | Thatcher |
| 2011/0072204 | A1 | 3/2011 | Chang |
| 2011/0099418 | A1 | 4/2011 | Chen |
| 2011/0153903 | A1 | 6/2011 | Hinkle |
| 2011/0161784 | A1 | 6/2011 | Selinger |
| 2011/0191525 | A1 | 8/2011 | Hsu |
| 2011/0218969 | A1 | 9/2011 | Anglin |
| 2011/0231598 | A1 | 9/2011 | Hatsuda |
| 2011/0258514 | A1 | 10/2011 | Lasser |
| 2011/0292538 | A1 | 12/2011 | Haga |
| 2011/0299317 | A1 | 12/2011 | Shaeffer |
| 2011/0302353 | A1 | 12/2011 | Confalonieri |
| 2012/0039117 | A1 | 2/2012 | Webb |
| 2012/0084523 | A1 | 4/2012 | Littlefield |
| 2012/0089774 | A1 | 4/2012 | Kelkar |
| 2012/0096330 | A1 | 4/2012 | Przybylski |
| 2012/0117399 | A1 | 5/2012 | Chan |
| 2012/0147021 | A1 | 6/2012 | Cheng |
| 2012/0159099 | A1 | 6/2012 | Lindamood |
| 2012/0159289 | A1 | 6/2012 | Piccirillo |
| 2012/0173792 | A1 | 7/2012 | Lassa |
| 2012/0203958 | A1* | 8/2012 | Jones ................ G06F 12/0246 711/103 |
| 2012/0210095 | A1 | 8/2012 | Nellans |
| 2012/0233523 | A1 | 9/2012 | Krishnamoorthy |
| 2012/0246392 | A1 | 9/2012 | Cheon |
| 2012/0278579 | A1 | 11/2012 | Goss |
| 2012/0284587 | A1 | 11/2012 | Yu |
| 2013/0013880 | A1 | 1/2013 | Tashiro |
| 2013/0054822 | A1 | 2/2013 | Mordani |
| 2013/0061029 | A1 | 3/2013 | Huff |
| 2013/0073798 | A1 | 3/2013 | Kang |
| 2013/0080391 | A1 | 3/2013 | Raichstein |
| 2013/0145085 | A1 | 6/2013 | Yu |
| 2013/0145089 | A1 | 6/2013 | Eleftheriou |
| 2013/0151759 | A1 | 6/2013 | Shim |
| 2013/0159251 | A1 | 6/2013 | Skrenta |
| 2013/0159723 | A1 | 6/2013 | Brandt |
| 2013/0166820 | A1 | 6/2013 | Batwara |
| 2013/0173845 | A1 | 7/2013 | Aslam |
| 2013/0191601 | A1 | 7/2013 | Peterson |
| 2013/0219131 | A1 | 8/2013 | Alexandron |
| 2013/0238955 | A1 | 9/2013 | D Abreu |
| 2013/0318283 | A1 | 11/2013 | Small |
| 2013/0318395 | A1 | 11/2013 | Kalavade |
| 2014/0006688 | A1 | 1/2014 | Yu |

(56) References Cited

U.S. PATENT DOCUMENTS

| | | |
|---|---|---|
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077968 A1 | 3/2016 | Sela |
| 2016/0098344 A1 | 4/2016 | Gorobets |
| 2016/0098350 A1 | 4/2016 | Tang |
| 2016/0110254 A1 | 4/2016 | Cronie |
| 2016/0154601 A1 | 6/2016 | Chen |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0285976 A1 | 10/2017 | Durham |
| 2017/0286311 A1 | 10/2017 | Juenemann |
| 2017/0322888 A1* | 11/2017 | Booth ............... G06F 3/0607 |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0088867 A1 | 3/2018 | Kaminaga |
| 2018/0107591 A1 | 4/2018 | Smith |
| 2018/0143780 A1 | 5/2018 | Cho |
| 2018/0150640 A1 | 5/2018 | Li |
| 2018/0167268 A1 | 6/2018 | Liguori |
| 2018/0173620 A1 | 6/2018 | Cen |
| 2018/0189182 A1 | 7/2018 | Wang |
| 2018/0212951 A1 | 7/2018 | Goodrum |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0349396 A1 | 12/2018 | Blagojevic |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0073262 A1 | 3/2019 | Chen |
| 2019/0087115 A1 | 3/2019 | Li |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0097189 A1 | 3/2020 | Tao |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime," Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

(56) References Cited

OTHER PUBLICATIONS

WOW: Wise Ordering for Writes—Combining Spatial and Temporal Locality in Non-Volatile Caches by Gill (Year: 2005).
Helen H. W. Chan et al. "HashKV: Enabling Efficient Updated in KV Storage via Hashing", https://www.usenix.org/conference/atc18/presentation/chan, (Year: 2018).

* cited by examiner

METHOD AND SYSTEM FOR ONLINE RECOVERY OF LOGICAL-TO-PHYSICAL MAPPING TABLE AFFECTED BY NOISE SOURCES IN A SOLID STATE DRIVE

BACKGROUND

Field

This disclosure is generally related to the field of data storage. More specifically, this disclosure is related to a method and system for online recovery of a logical-to-physical mapping table affected by noise sources in a solid state drive.

Related Art

The proliferation of the Internet and e-commerce continues to create a vast amount of digital content. Various distributed storage systems have been created to access and store such digital content. A storage system can include volatile memory (e.g., dynamic random access memory (DRAM)) and multiple drives (e.g., a solid state drive (SSD) or a hard disk drive (HDD)). The normal operation of an SSD relies on correct mapping information between a logical address and its corresponding physical address (e.g., between a logical block address (LBA) and a physical block address (PBA)). The system can store the mapping information in a logical-to-physical (L2P) mapping table, and can continually update the L2P table based on executing real-time write operations from both a host and background operations (e.g., garbage collection). To ensure the performance of the system, this critical mapping table is typically stored in low-latency memory, such as in static random access memory (SRAM) or DRAM accessible to an SSD controller.

However, as the density and capacity of both SRAM and DRAM continues to increase, various noise sources may cause "disturbance errors" in nearby memory cells while accessing a given memory cell. These noise sources may cause multiple bits to flip simultaneously. Exemplary noise sources which can cause bit flipping include but are not limited to: electrical or magnetic interference; background radiation, as from cosmic particles; and data retention/access. At the same time, SRAM and DRAM can currently correct only one bit-flipping error. This can result in increasing the probability of an error in the L2P mapping table (e.g., by losing data in the L2P mapping table), which can result in a mis-functioning of the SSD based on the missing mapping information.

One current solution to handle error recovery of the L2P mapping table is to concurrently write the LBA together with the data content into the location at the PBA of the storage drive. When the system detects an error in the L2P mapping table (e.g., experiences a memory error such as a DRAM or SRAM crash, or detects an error associated with a certain LBA), the storage drive cannot be used. A system administrator or process must un-mount the drive, read out all the physical pages to collect the corresponding LBA information, and rebuild the L2P mapping table based on the collected LBA information read out from the physical pages. The system must verify the mapping table, and only then can the system administrator or other process re-mount the drive (e.g., restore the drive). This process requires reading the entire storage drive, and, given the increasingly high capacity of current storage drives, may take a significant amount of time, during which time the storage drive is offline and cannot provide any service. Thus, this current solution for handling error recovery of the L2P mapping table can result in a decrease in the efficiency and performance of the overall storage system.

SUMMARY

One embodiment facilitates error recovery. During operation, the system receives an input/output request indicating data associated with a first logical block address. The system detects, in a mapping table stored in a memory, an error associated with the first logical block address, wherein the mapping table maps logical block addresses to physical block addresses. The system obtains a first physical block address corresponding to the first logical block address based on a dedicated block. In some embodiments, the dedicated block stores log entries with logical block addresses corresponding to sequentially programmed physical blocks, and the system obtains the first physical block address corresponding to the first logical block address based on the sequentially programmed physical blocks. The system executes the I/O request by accessing the first physical block address.

In some embodiments, the system identifies a dedicated block which stores log entries with logical block addresses corresponding to sequentially programmed physical blocks. The system performs a search in the dedicated block to obtain a most recent valid log entry for the first logical block address, wherein obtaining the first physical block address corresponding to the first logical block address is further based on the sequentially programmed physical blocks.

In some embodiments, a respective log entry for a respective logical block address in the dedicated block includes a bit indicating whether the respective logical block address is valid or invalid. A bit value of zero indicates that the respective logical block address is invalid, and a bit value of one indicates that the respective logical block address is valid.

In some embodiments, the system inserts, in the dedicated block, a first log entry with a bit value of one for the first logical block address, which indicates that the first logical block address is valid and that the first physical block address is valid. The system inserts, in the dedicated block, a second log entry with a bit value of zero for the first logical block address, which indicates that the first logical block address is invalid and that the first physical block address is invalid. Inserting the second log entry further removes a mapping between the first logical block address and the first physical block address, and further marks the second log entry as ready to be deleted. The system inserts, in the dedicated block, a third log entry with a bit value of one for the first logical block address, which indicates that the first logical block address has an updated corresponding physical block address.

In some embodiments, the system identifies one or more log entries with the bit value set to zero. The system invalidates one or more logical block addresses of the identified one or more log entries.

In some embodiments, performing the search in the dedicated block to obtain the most recent valid log entry for the first logical block address further comprises: performing a search in the dedicated block to obtain an earliest log entry for the first logical block address; and obtaining, based on the earliest log entry, an earliest physical block address corresponding to the first logical block address based on the sequentially programmed physical blocks.

In some embodiments, the system performs a search in the dedicated block to obtain other log entries for the first logical block address. In response to obtaining one or more other log entries, the system identifies the most recent valid log entry from the other log entries for the first logical block address. In response to obtaining no other log entries, the system uses the earliest physical block address as the obtained physical block address which is accessed for executing the I/O request.

In some embodiments, detecting the error associated with the first logical block address further comprises detecting that the error is associated with a first entry in the mapping table, and the first entry indicates the first logical block address and the first physical block address. The system determines that physical block addresses indicated in adjacent entries to the first entry in the mapping table are not in a same superblock as the dedicated block, wherein the dedicated block stores log entries with logical block addresses corresponding to sequentially programmed physical blocks and includes one or more log entries for the first logical block address. The system marks the adjacent entries as requiring recovery.

In some embodiments, the system determines that the physical block addresses indicated in the adjacent entries to the first entry in the mapping table are in the same superblock as the dedicated block. The system compacts the dedicated block by performing the search in the dedicated block to obtain the most recent valid log entry for the first logical block address. The system can compact the dedicated block by combining log entries, e.g., by using the most recent valid log entry.

In some embodiments, the dedicated block comprises a memory element which stores one or two bits per cell. The dedicated block is part of a superblock which comprises a plurality of data blocks, a parity block which stores parity information for data stored in the data blocks, and the dedicated block. The plurality of data blocks comprise the sequentially programmed physical blocks corresponding to the dedicated block.

BRIEF DESCRIPTION OF THE FIGURES

In the figures, like reference numerals refer to the same figure elements.

DETAILED DESCRIPTION

Figure 1:
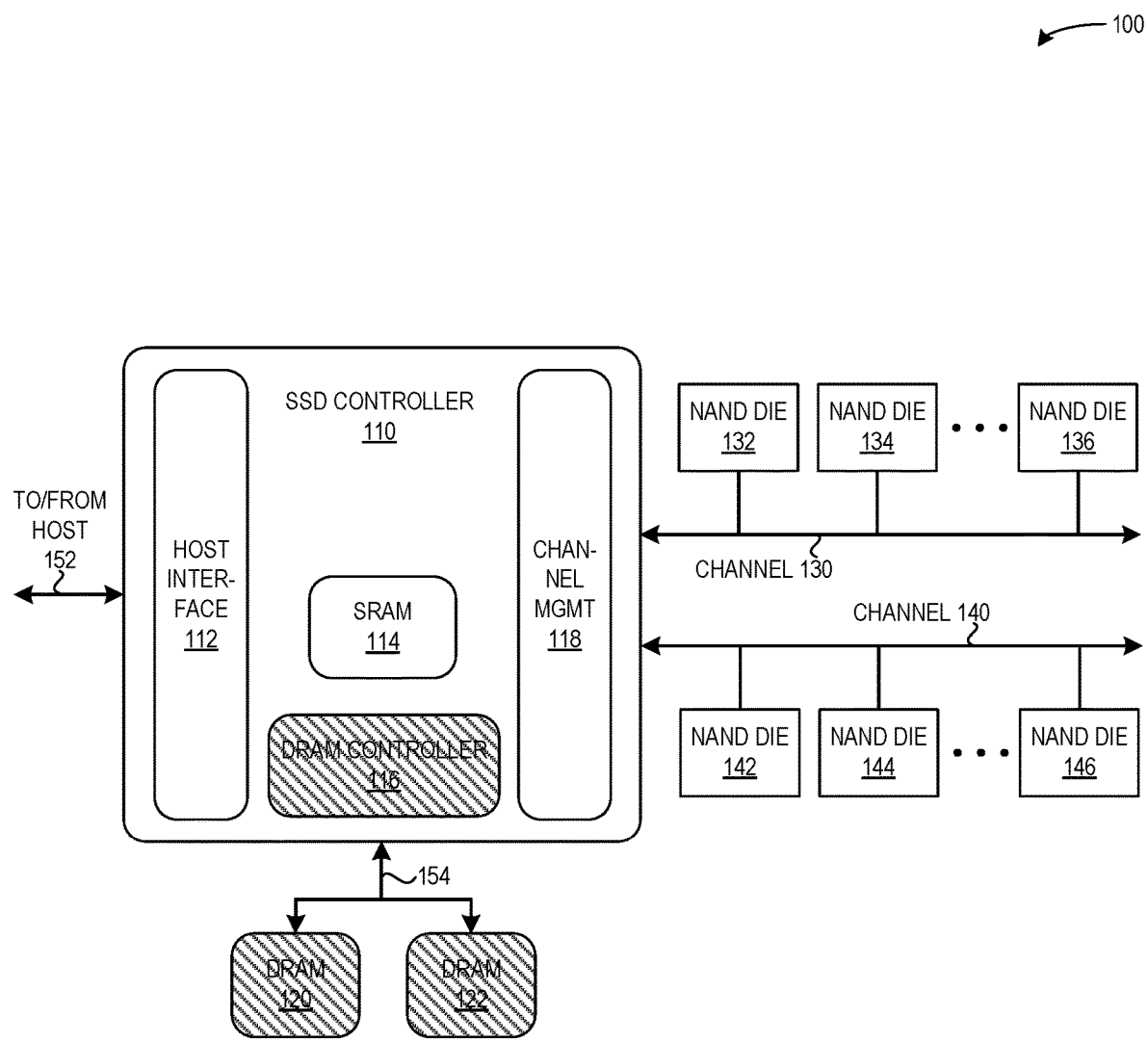
FIG. 1 illustrates an exemplary environment for storing a logical-to-physical (L2P) mapping table, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of recovering from an error in an L2P mapping table, e.g., an error resulting from storing the L2P mapping table in an SSD low-latency memory where data retention/storage may be affected by various noise sources.

As described above, the normal operation of an SSD relies on correct mapping information between a logical address and its corresponding physical address. The system can store the mapping information in a logical-to-physical (L2P) mapping table, and can continually update the L2P table based on executing real-time write operations from both a host and background operations (e.g., garbage collection). To ensure the performance of the system, this critical mapping table is typically stored in low-latency memory, such as in SRAM or DRAM accessible to an SSD controller.

However, as the density and capacity of both SRAM and DRAM continues to increase, various noise sources may flip multiple bits simultaneously (e.g., from electrical/magnetic interference and cosmic particles). At the same time, SRAM and DRAM can currently correct only one bit-flipping error. This can result in increasing the probability of an error in the L2P mapping table (e.g., by losing data in the L2P mapping table), which can result in a mis-functioning of the SSD based on the missing mapping information.

One current solution to handle error recovery of the L2P mapping table is to concurrently write the LBA together with the data content into the location at the PBA of the storage drive, as described below in relation to FIG. 1. When the system detects an error in the L2P mapping table (e.g., experiences a memory error such as a DRAM or SRAM crash, or detects an error associated with a certain LBA), the storage drive cannot be used. A system administrator or process must un-mount the drive, read out all the physical pages to collect the corresponding LBA information, rebuild the L2P mapping table based on the collected LBA information read out from the physical pages, verify the mapping table, and subsequently re-mount/restore the drive. This process requires reading the entire storage drive, and, given the high capacity of current storage drives, may take a significant amount of time, during which time the storage drive is offline and cannot provide any service. Thus, this current solution for handling error recovery of the L2P mapping table can decrease the efficiency and performance of the overall storage system.

The embodiments described herein address the challenges and inefficiencies involved with the current solution of handling error recovery in the L2P mapping by using a "dedicated LBA block" in a superblock to store LBA information for data stored in the superblock. Within one superblock, the sequence to program the NAND pages in the blocks of the superblock is predetermined, e.g., performed sequentially and to compensate for cell-to-cell interference. Therefore, the dedicated LBA block can store log entries which can reflect the corresponding PBA without having to store the actual PBA, as the sequence of log entries in the dedicated LBA block already maps the PBA information. An exemplary dedicated LBA block is described below in relation to FIG. 2, and an exemplary method for facilitating error recovery of an L2P mapping table using the dedicated LBA block is described below in relation to FIGS. 4, 5, 6A, and 6B.

Thus, by using a dedicated block in a superblock to store only the LBA information, the system can efficiently recover a corresponding PBA for a given LBA listed in the dedicated block based on the sequentially programmed physical blocks. Furthermore, because of the predetermined sequence for the sequentially programmed physical blocks, the system does not need to store the value of this corresponding PBA in the dedicated LBA block. As an improvement over the current solution of handling error recovery (e.g., un-mounting a drive, reading the entire drive to rebuild the L2P mapping table, verifying the mapping table, and re-mounting the drive), the embodiments described herein allow the drive to remain online, rather than be taken offline for a significant period of time. This can result in improving the overall performance and efficiency of the storage system.

A "storage drive" refers to a device or a drive with a non-volatile memory which can provide persistent storage of data, e.g., a solid state drive (SSD) or a hard disk drive (HDD).

A "storage server" refers to a computing device which can include multiple storage drives. A distributed storage system can include multiple storage servers.

A "logical address" can refer to an address at which an item appears to reside from an application's perspective, and can be used by a host to address blocks of data to be stored on a storage drive. Examples of a logical address include a logical block address (LBA) and a logical page address (LPA).

A "physical address" can refer to an address or a physical location in a non-volatile memory of a storage drive at which an item (e.g., data) is stored or written. Examples of a physical address include a physical block address (PBA) and a physical page address (PPA).

A "logical-to-physical" or "L2P" mapping table is a table which stores a mapping of logical addresses of data (which has been or is to be read or written) to physical addresses of the physical storage media, e.g., to a block of a NAND flash. The L2P mapping table is generally stored in DRAM or SRAM.

NAND flash memory can store a certain number of bits per cell. For example: a "single-level cell" or "SLC" memory element can store one bit of information per cell; a "multi-level cell" or "MLC" memory element can store two bits of information per cell; a "triple-level cell" or "TLC" memory element can store three bits of information per cell; and a "quad-level cell" or "QLC" memory element can store four bits of information per cell.

Exemplary Storage of L2P Mapping Table in the Prior Art

FIG. 1 illustrates an exemplary environment 100 for storing a logical-to-physical (L2P) mapping table, in accordance with the prior art. Environment 100 can depict the internal structure of a solid state drive (SSD), which can include an SSD controller 110. SSD controller 110 can communicate with a host via a communication to/from host 152. SSD controller 110 can also include: a host interface 112 for communicating with the host; static random access memory (SRAM) 114; a DRAM controller 116, which can manage and access DRAMs 120 and 122 via a communication 154; and a channel management module 118 for managing data via channels 130 and 140 to and from the physical media of, respectively, NAND dies 132, 134, and 136 and NAND dies 142, 144, and 146.

During operation, SSD controller 110 can receive a logical block address and a data block from the host, and can subsequently write the data block into the physical NAND flash (e.g., one of NAND dies 132-136 and 142-146). The system can persistently store the mapping of the logical block address to the physical block address (i.e., the "L2P mapping") in the NAND flash itself, but may also buffer the L2P mapping in SRAM 114 or DRAMs 120 or 122 (via DRAM controller 116). DRAM controller 116 and DRAMs 120 and 122 are depicted with left-slanting diagonal lines, and DRAMs 120 and 122 can be off-chip memory elements.

As described above, the density and capacity of both SRAM and DRAM continues to increase, and various noise sources (e.g., cosmos particle) may flip multiple bits simultaneously. However, at the same time, SRAM and DRAM can currently correct only one error, which can result in increasing the probability of an error in the L2P mapping table (e.g., by losing data in the L2P mapping table). This can result in a mis-functioning of the SSD.

In the previously described current solution to handle error recovery of the L2P mapping table, the LBA is written concurrently together with the data content into the location at the PBA of the storage drive. When the system detects an error in the L2P mapping table (e.g., experiences a memory error such as a DRAM or SRAM crash, or detects an error associated with a certain LBA), the entire storage drive cannot be used. As described herein, the entire storage drive must be un-mounted, the L2P mapping must be rebuilt by reading out all the physical pages to collect the corresponding LBA information, the mapping table must be verified, and then the entire storage must be re-mounted. This process can be time-consuming, especially given the high capacity of current storage drives. During this time, the storage drive is offline and cannot provide any service, which can decrease the efficiency and performance of the overall storage system.

Exemplary Environment for Facilitating Error Recovery: Dedicated LBA Block in a Superblock The embodiments described herein address the challenges and inefficiencies involved with the current solution of handling error recovery (described above in relation to FIG. 1) by using a dedicated block in a superblock to store LBA information for data stored in the superblock. Current SSDs may program data in units of superblocks, and a superblock can include multiple NAND blocks across multiple channels. The described embodiments can use a dedicated block within a superblock to provide a "simplified" L2P mapping.

Figure 2:
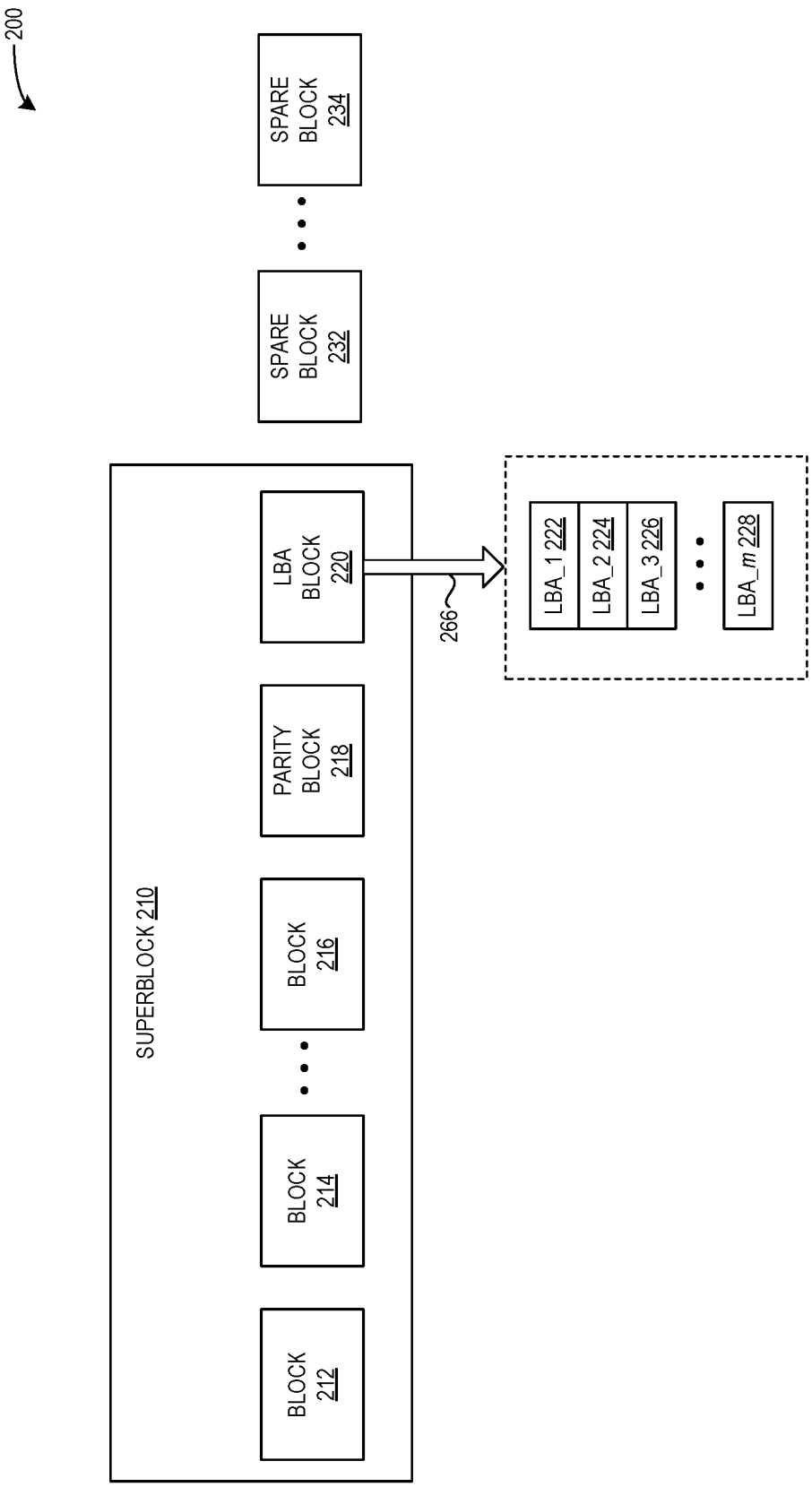
FIG. 2 illustrates an exemplary environment which facilitates error recovery of an L2P mapping table, including a dedicated block in a superblock, in accordance with an embodiment of the present application.

FIG. 2 illustrates an exemplary environment 200 which facilitates error recovery of an L2P mapping table, including a dedicated block in a superblock, in accordance with an embodiment of the present application. Environment 200 can include a superblock 210 and a plurality of spare blocks (such as spare blocks 232 and 234). Superblock 210 can include: a plurality of data blocks (such as blocks 212, 214, and 216); a parity block 218, which stores parity information for data stored in the data blocks of superblock 210; and a "dedicated" LBA block 220.

Within one superblock, such as superblock 210, the sequence to program the NAND pages in the blocks of the superblock is predetermined, e.g., performed sequentially and to compensate for cell-to-cell interference. Therefore, dedicated LBA block 220 does not need to record the PBA information, as the sequence of log entries in LBA block 220 already maps the PBA information. That is, because the physical pages are programmed according to the predetermined sequence, the log entries in LBA block 220 reflect the corresponding PBA, without needing to store the actual PBA.

The system may delete or trim a given LBA, which invalidates both the given LBA and the corresponding PBA, as described below in relation to FIG. 3A. The system may also update data associated with a given LBA, as described below in relation to FIG. 3B.

The dedicated LBA block can be formatted and used as a memory element with a certain number of bits per cell. As the number of bits per cell increases, so decreases (generally) the cost of the associated SSD as well as the endurance. Using an MLC or SLC block can provide increased reliability, robustness, and performance, as compared to using a high density TLC or QLC block. Thus, in the embodiments described herein, the system can use a high density TLC or QLC block as an MLC or SLC block with a significantly improved robustness to hold the valuable LBA information in LBA block 220.

Figure 3:
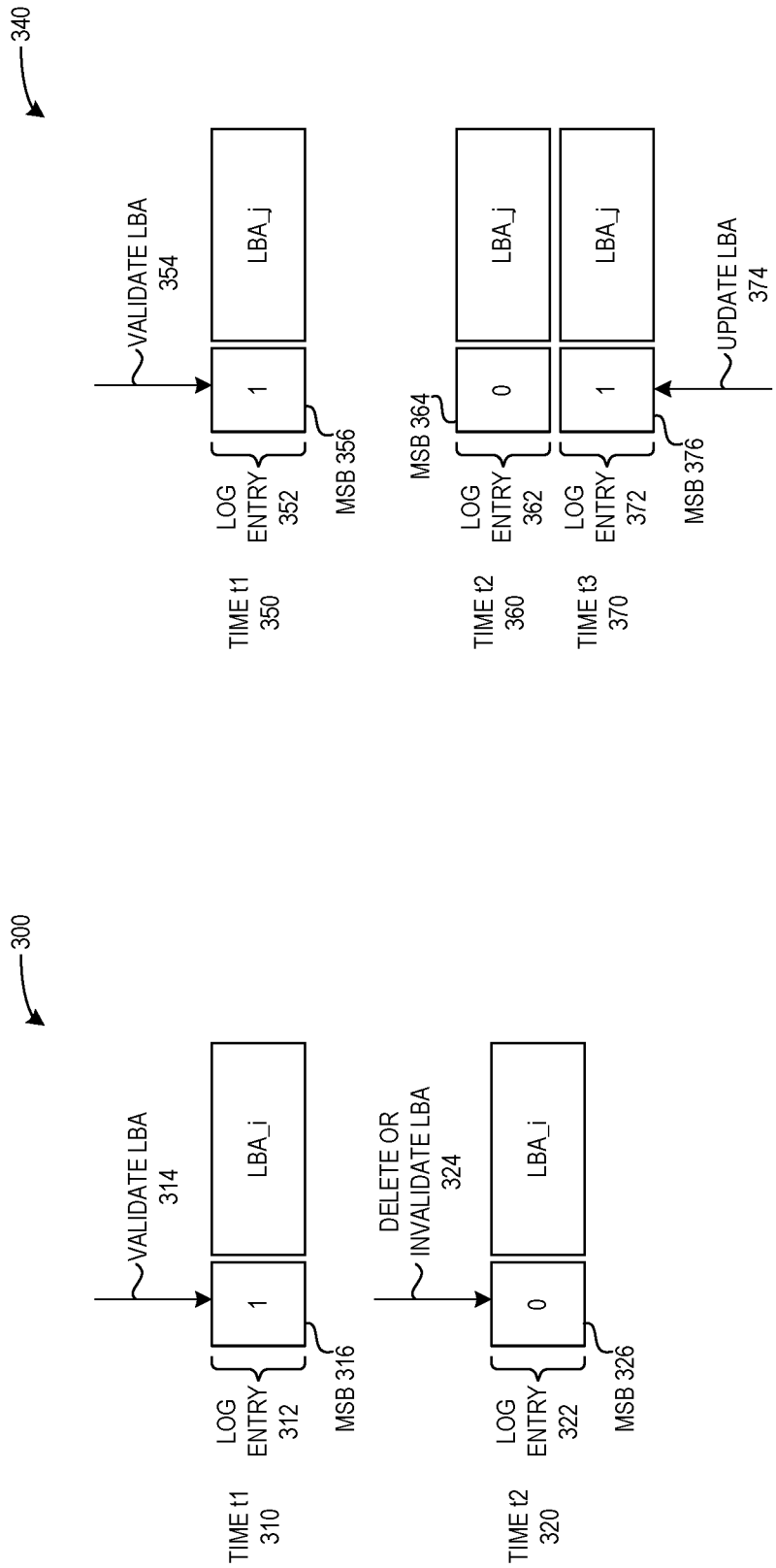
FIG. 3A illustrates a mechanism for facilitating error recovery of an L2P mapping table, including deleting or invalidating a logical block address and its corresponding physical block address, in accordance with an embodiment of the present application.
FIG. 3B illustrates a mechanism for facilitating error recovery of an L2P mapping table, including updating a logical block address and its corresponding physical block address, in accordance with an embodiment of the present application.

Exemplary Mechanism and Communication for Facilitating Error Recovery of an L2P Mapping Table FIG. 3A illustrates a mechanism 300 for facilitating error recovery of an L2P mapping table, including deleting or invalidating a logical block address and its corresponding physical block address, in accordance with an embodiment of the present application. The system can store log entries in a dedicated LBA block (e.g., as depicted in dedicated LBA block 220 of FIG. 2) to facilitate error recovery of the L2P mapping table stored in the volatile memory. The system can use a most significant bit (MSB) before the LBA to indicate a status or state of the LBA. At a time t1 310, the system can validate an LBA_i (operation 314), and a corresponding log entry 312 can include a value for LBA_i and an MSB 316 set to a value of 1. At a later time, such as at a time t2 320, the system can delete or invalidate LBA_i (operation 324), and a corresponding log entry 322 can include the value for LBA_i and an MSB 326 set to a value of 0.

FIG. 3B illustrates a mechanism 350 for facilitating error recovery of an L2P mapping table, including updating a logical block address and its corresponding physical block address, in accordance with an embodiment of the present application. At a time t1 350, the system can validate an LBA_j (operation 354), and a corresponding log entry 352 can include a value for LBA_j and an MSB 356 set to a value of 1. At a later time, such as at a time t2 360, the system can delete or invalidate LBA_j, and a corresponding log entry 362 can include the value for LBA_j and an MSB 364 set to a value of 0. At yet another later time, such as at a time t3 370, the system can update LBA_j (operation 374), and a corresponding log entry 372 can include the value for LBA_j and an MSB 376 set to a value of 1.

When performing the error recovery process described herein, the system can "compact" the log entries in the dedicated LBA block by performing a search in the dedicated LBA block to obtain the most recent valid log entry for a given LBA. For example, the system can update LBA_j by combining or compacting log entries 362 and 372 of FIG. 3B. That is, log entry 372 (which is the most recent valid entry, with the MSB set to a value of 1) can essentially replace all prior log entries for LBA_j, including log entries 362 and 352.

Figure 4:
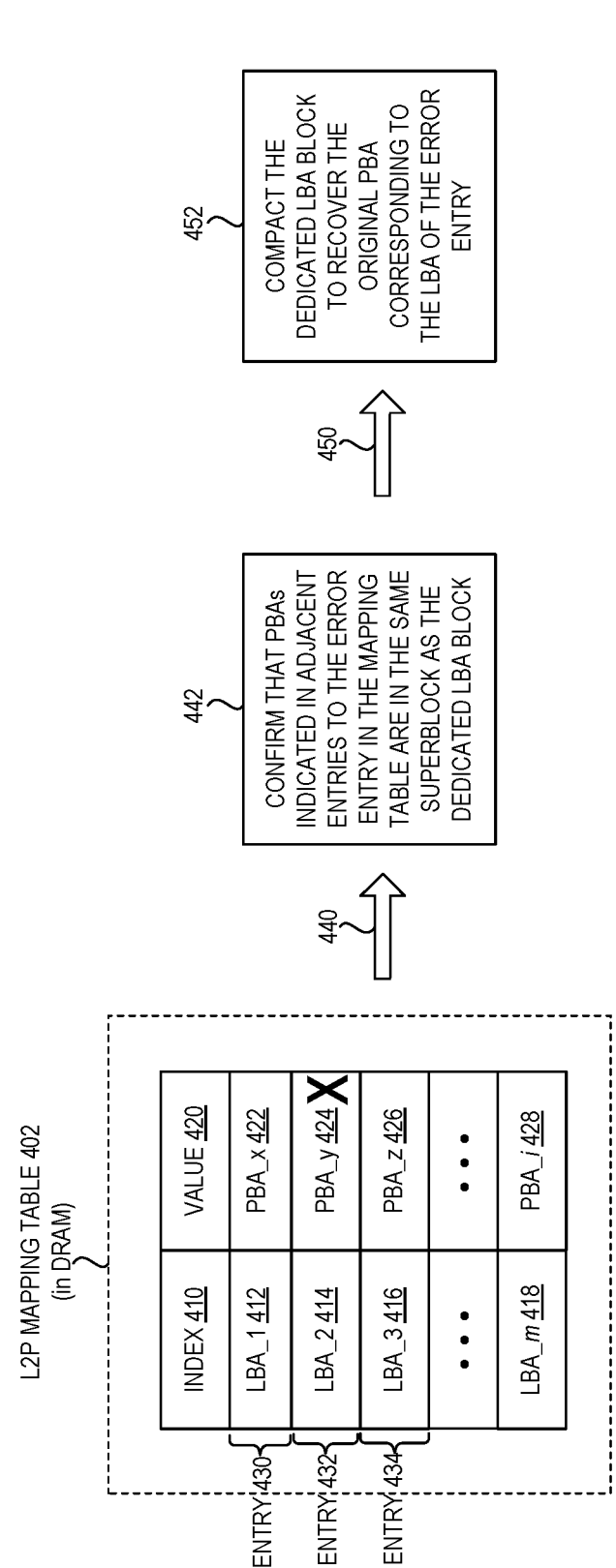
FIG. 4 illustrates an exemplary communication which facilitates error recovery of an L2P mapping table, in accordance with an embodiment of the present application.

FIG. 4 illustrates an exemplary communication 400 which facilitates error recovery of an L2P mapping table, in accordance with an embodiment of the present application. During operation, the system can store an L2P mapping table 402 in DRAM. Mapping table 402 can include entries with an index 410 and a value 420. Index 410 can be a logical block address, and value 420 can be the corresponding physical block address for the logical block address. For example: an entry 430 can include an index of LBA_1 412 and a value of PBA_x 422; an entry 432 can include an index of LBA_2 414 and a value of PBA_y 424; and an entry 434 can include an index of LBA_3 416 and a value of PBA_z 426.

During operation, the system may detect an error in L2P mapping table 402, e.g., in entry 432, as indicated by the bold "X" for PBA_y 424. The error can indicate that the corresponding PBA for LBA_2 414 is missing or cannot be retrieved ("missing PBA information"). As a result, the system can perform a set of operations and use the dedicated LBA block to recover the missing PBA information. The system can determine whether physical block addresses indicated in adjacent entries to entry 432 in the mapping table are in the same superblock as the dedicated block for LBA_2 414 or as the physical block address corresponding to LBA_2 414 (operation 442 via a depicted arrow 440). If the physical block addresses for the adjacent LBAs (e.g., PBA_x 422 and PBA_z 426 of, respectively, entries 430 and 434) are not in the same superblock, the system can mark the adjacent entries in L2P mapping table 402 as requiring recovery. If the physical block addresses for the adjacent LBAs are in the same superblock, the system can proceed to compact the dedicated LBA block to recover the original PBA corresponding to the LBA of entry 432 (operation 452 via a depicted arrow 450). The system can then use the recovered PBA to execute an ongoing I/O request or a background operation or other read/write operation which requires accessing the data corresponding to the LBA at the location of the recovered PBA. The system can also refresh L2P mapping table stored in the volatile memory (e.g., in DRAM), and update the missing PBA information with the recovered PBA.

Exemplary Method for Facilitating Error Recovery of an L2P Mapping Table

Figure 5A:
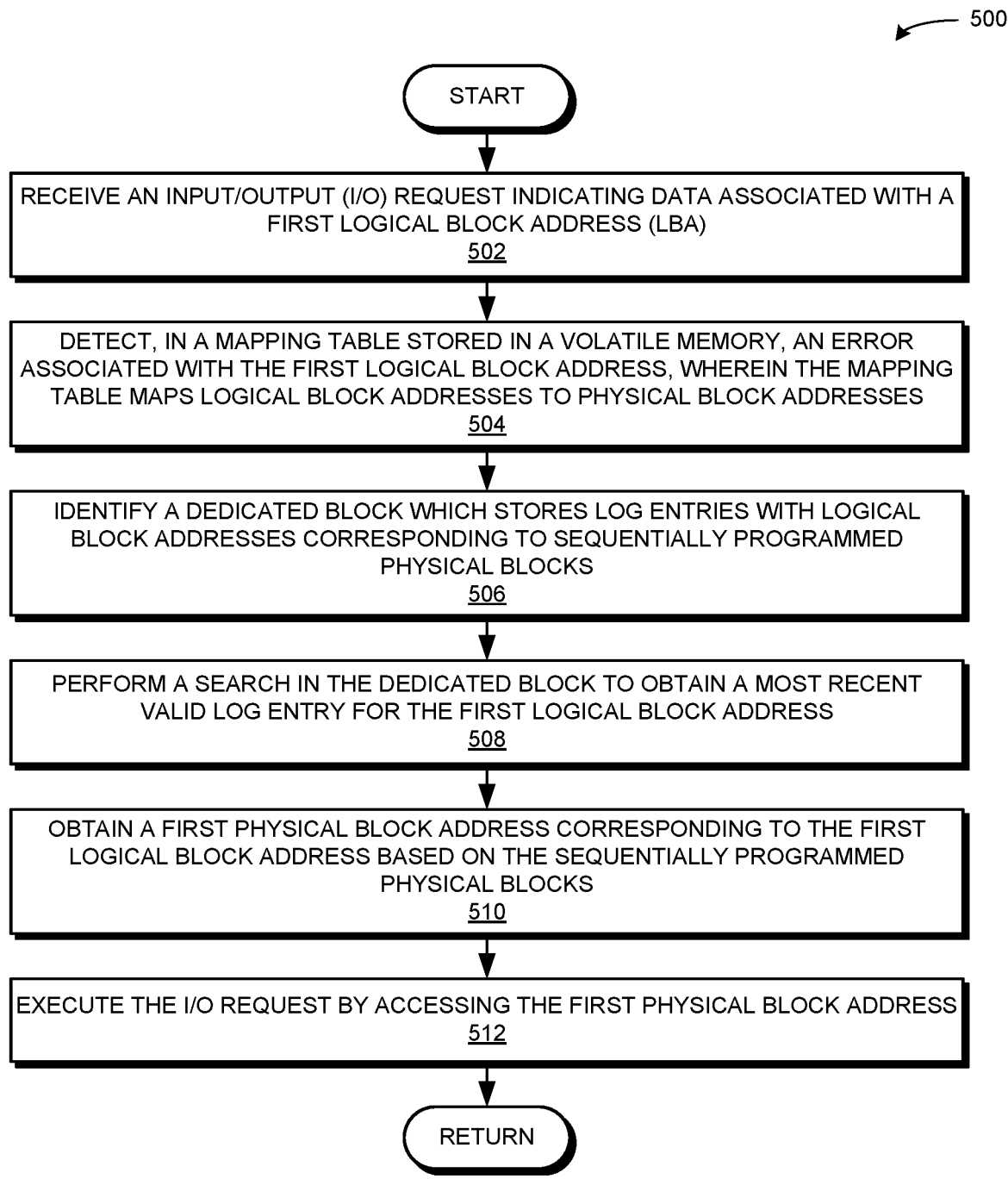
FIG. 5A presents a flowchart illustrating a method for facilitating error recovery of an L2P mapping table, in accordance with an embodiment of the present application.

FIG. 5A presents a flowchart 500 illustrating a method for facilitating error recovery of an L2P mapping table, in accordance with an embodiment of the present application. During operation, the system receives an input/output (I/O) request indicating data associated with a first logical block address (LBA) (operation 502). The system detects, in a mapping table stored in a volatile memory, an error associated with the first logical block address, wherein the mapping table maps logical block addresses to physical block addresses (operation 504). The system identifies a dedicated block which stores log entries with logical block addresses corresponding to sequentially programmed physical blocks (operation 506). The system performs a search in the dedicated block to obtain a most recent valid log entry for the first logical block address (operation 508). The system obtains a first physical block address corresponding to the first logical block address based on the sequentially programmed physical blocks (operation 510). The system executes the I/O request by accessing the first physical block address (operation 512).

Figure 5B:
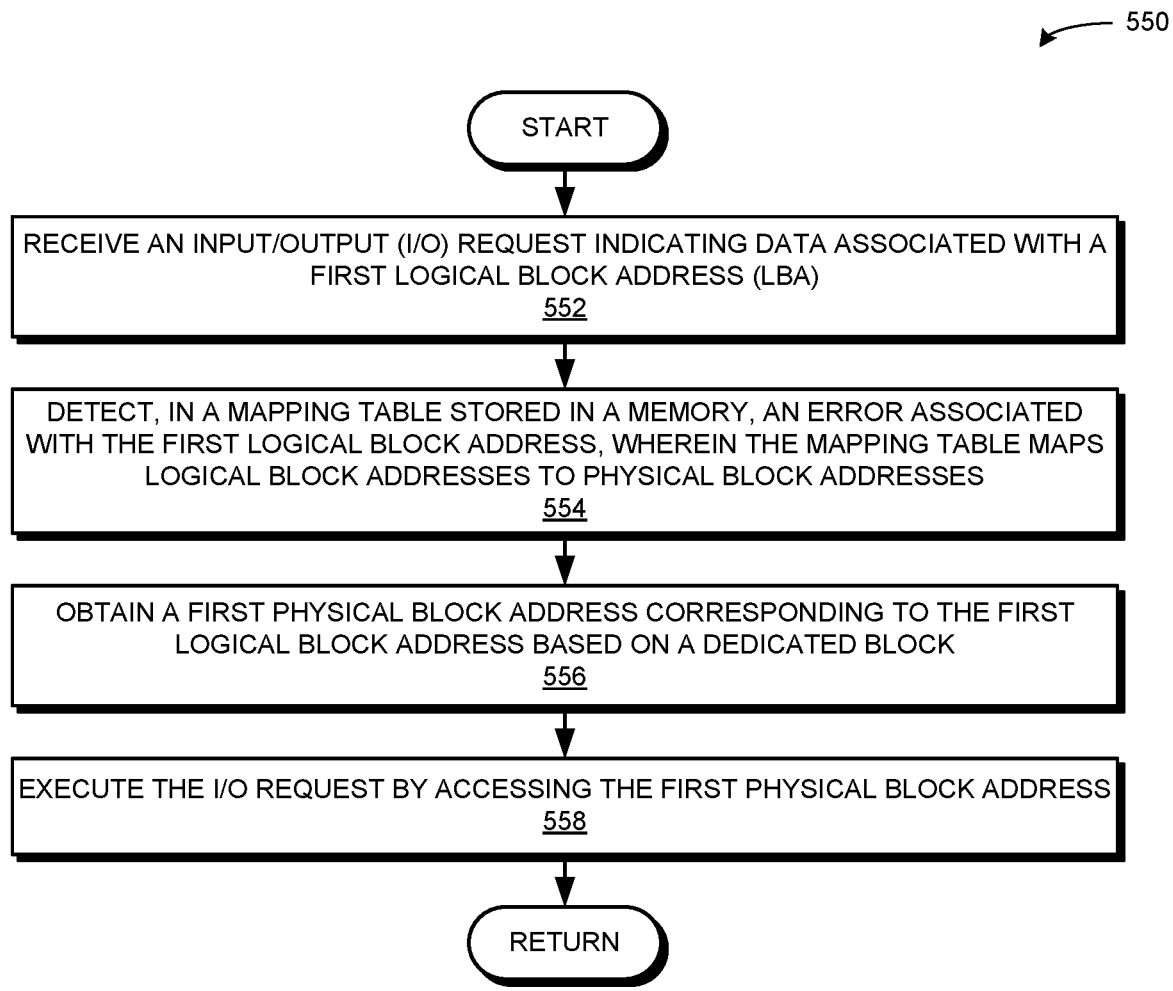
FIG. 5B presents a flowchart illustrating a method for facilitating error recovery of an L2P mapping table, in accordance with an embodiment of the present application.

FIG. 5B presents a flowchart 550 illustrating a method for facilitating error recovery of an L2P mapping table, in accordance with an embodiment of the present application. During operation, the system receives an input/output (I/O) request indicating data associated with a first logical block address (LBA) (operation 552). The system detects, in a mapping table stored in a memory, an error associated with the first logical block address, wherein the mapping table maps logical block addresses to physical block addresses (operation 554). The mapping table can be stored in a volatile or a non-volatile memory. The system obtains a first physical block address corresponding to the first logical block address based on a dedicated block (operation 556). As described herein, the dedicated block can store log entries with logical block addresses corresponding to sequentially programmed physical blocks. The system executes the I/O request by accessing the first physical block address (operation 558).

Figure 6A:
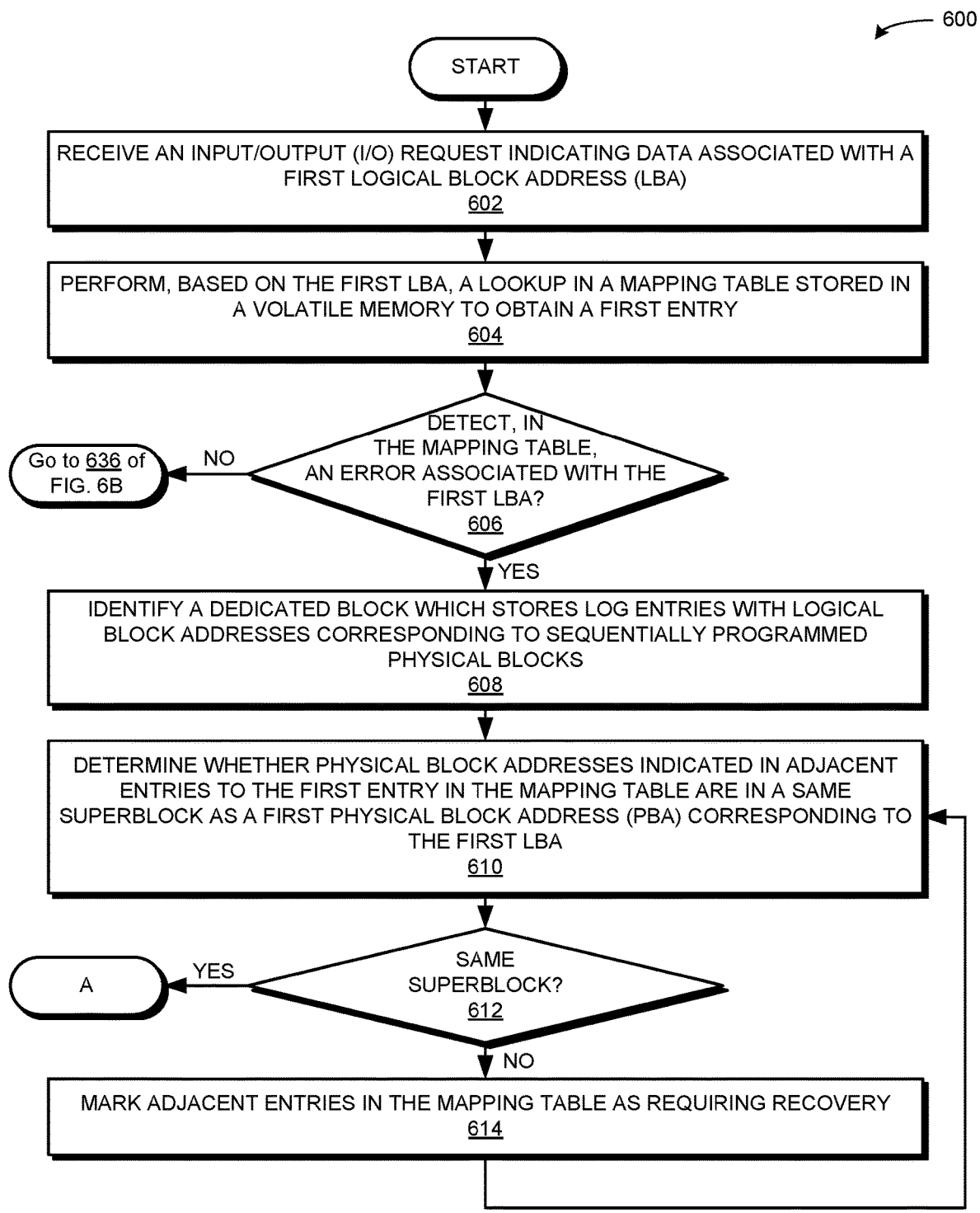
FIG. 6A presents a flowchart illustrating a method for facilitating error recovery of an L2P mapping table, in accordance with an embodiment of the present application.

FIG. 6A presents a flowchart 600 illustrating a method for facilitating error recovery of an L2P mapping table, in accordance with an embodiment of the present application. During operation, the system receives an input/output (I/O) request indicating data associated with a first logical block address (LBA) (operation 602). The system performs, based on the first LBA, a lookup in a mapping table stored in a volatile memory to obtain a first entry (operation 604). The mapping table maps logical block addresses to physical block addresses. If the system does not detect, in the mapping table, an error associated with the first logical block address (decision 606), the operation continues at operation 636 of FIG. 6B.

If the system does detect, in the mapping table, an error associated with the first logical block address (decision 606), the system identifies a dedicated block which stores log entries with logical block addresses corresponding to sequentially programmed physical blocks (operation 608). As described above, the dedicated block does not store the value of a respective corresponding physical block address for a logical block address in an entry.

The system determines whether physical block addresses indicated in adjacent entries ("adjacent PBAs") to the first entry in the mapping table are in a same superblock as the first physical block address corresponding to the first logical block address (e.g., in a same superblock as the dedicated block) (operation 610). If the adjacent PBAs are not in the same superblock (decision 612), the system marks the adjacent entries in the mapping table as requiring recovery, and the operation returns to operation 610. If the adjacent PBAs are in the same superblock (decision 612), operation continues at Label A of FIG. 6B.

Figure 6B:
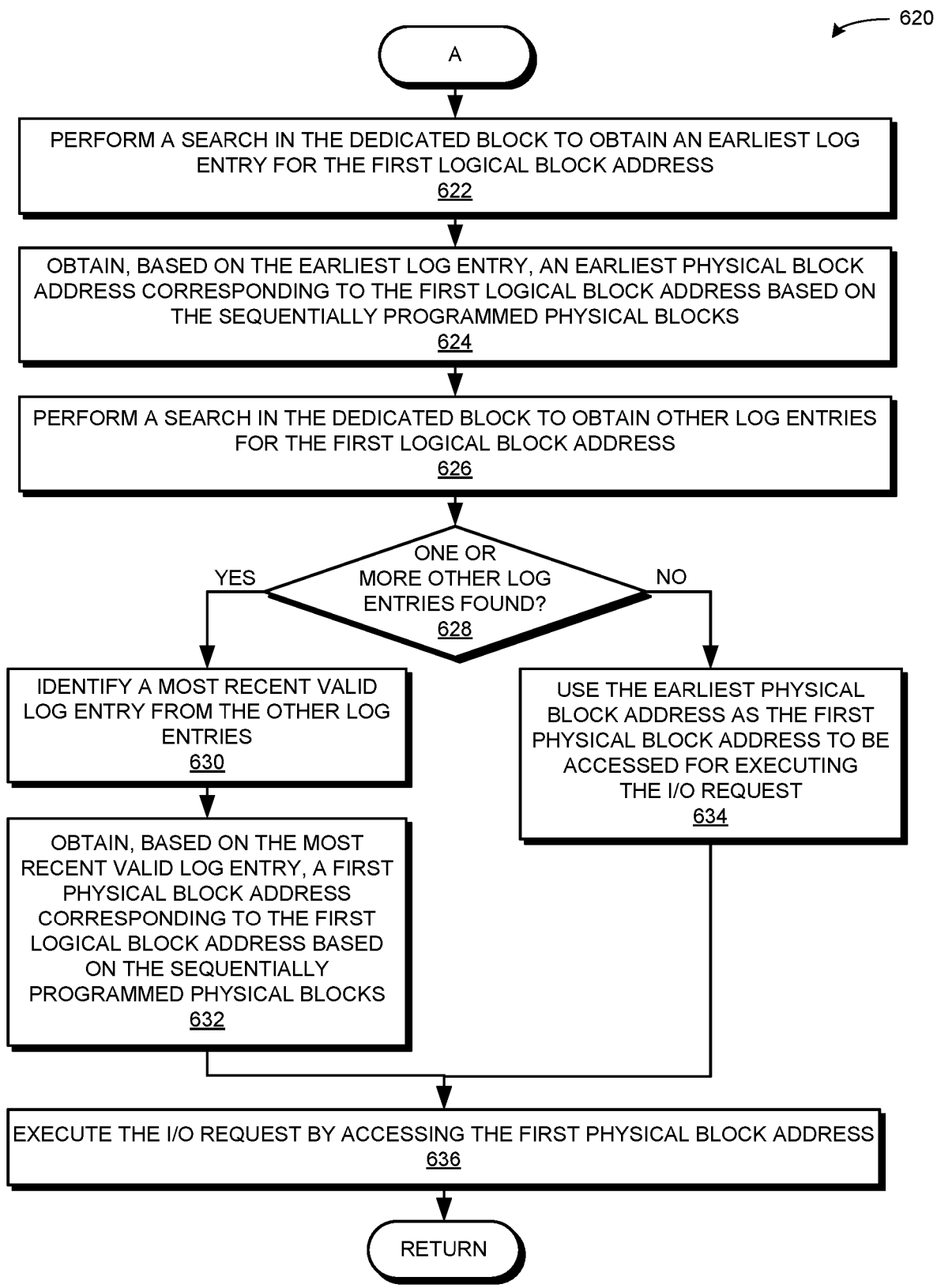
FIG. 6B presents a flowchart illustrating a method for facilitating error recovery of an L2P mapping table, in accordance with an embodiment of the present application.

FIG. 6B presents a flowchart 620 illustrating a method for facilitating error recovery of an L2P mapping table, in accordance with an embodiment of the present application. During operation, the system performs a search in the dedicated block to obtain an earliest log entry for the first logical block address (operation 622). The system obtains, based on the earliest log entry, an earliest physical block address corresponding to the first logical block address based on the sequentially programmed blocks (operation 624). The system performs a search in the dedicated block to obtain other log entries for the first logical block address (operation 626). If the system finds one or more other log entries (decision 628), the system identifies a most recent valid log entry from the other log entries (operation 630), and obtains, based on the most recent valid log entry, a first physical block address corresponding to the first logical block address based on the sequentially programmed physical blocks (operation 632).

If the system does not find one or more other log entries (decision 628), the system uses the earliest physical block address as the first physical block address to be accessed for executing the I/O request (operation 634). In some embodiments, the system determines whether the earliest log entry (obtained in operation 622) indicates a valid or invalid logical block address. If the earliest log entry indicates a valid entry, the operation proceeds as described above (operation 624 and onwards). However, if the earliest log entry indicates an invalid entry, and if there is no most recent valid log entry found, this indicates that the first logical block address has been invalidated or deleted. The system can subsequently respond to an attempt to access an invalid logical block address based on predetermined rules set in a protocol agreed upon by the host and the storage drive.

The system executes the I/O request by accessing the first physical block address (operation 636), and the operation returns. The first physical block address can also be obtained by successfully accessing the L2P mapping table stored in volatile memory, e.g., based on a successful search in the mapping table, from operation 604 and decision 606 of "no error detected").

Exemplary Computer System and Apparatus

Figure 7:
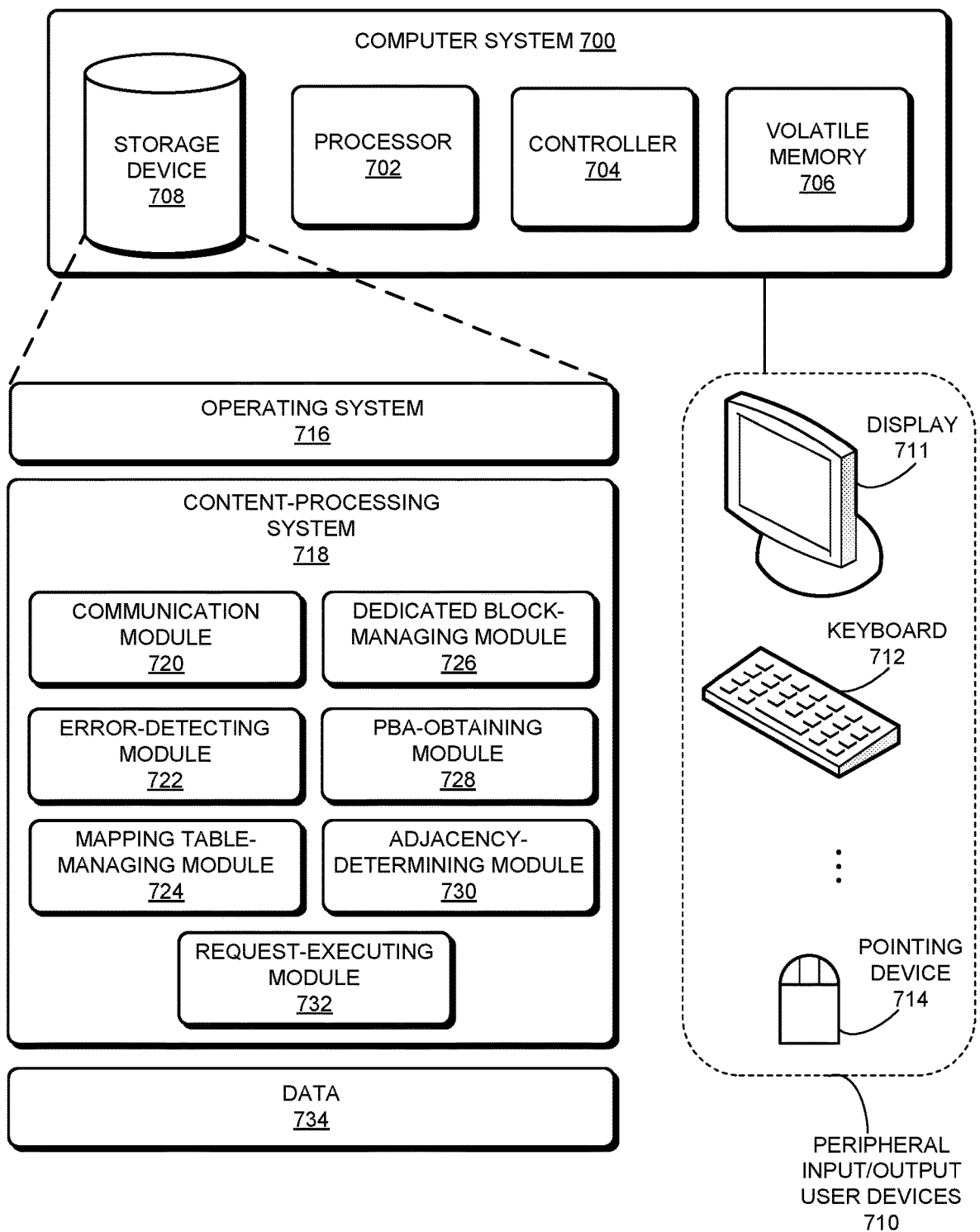
FIG. 7 illustrates an exemplary computer system that facilitates error recovery of an L2P mapping table, in accordance with an embodiment of the present application.

FIG. 7 illustrates an exemplary computer system 700 that facilitates error recovery of an L2P mapping table, in accordance with an embodiment of the present application. Computer system 700 includes a processor 702, a controller 704, a volatile memory 706, and a storage device 708. Volatile memory 706 can include, e.g., random access memory (RAM), that serves as a managed memory, and can be used to store one or more memory pools. Storage device 708 can include persistent storage which can be managed or accessed via controller 704. Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 734.

Content-processing system 718 can include instructions, which when executed by computer system 700, can cause computer system 700 to perform methods and/or processes described in this disclosure. Specifically, content-processing system 718 can include instructions for receiving and transmitting data packets, including data to be read or written, an input/output (I/O) request (e.g., a read request or a write request), and data associated with an I/O request (communication module 720).

Content-processing system 718 can further include instructions for receiving an input/output (I/O) request indicating data associated with a first logical block address (communication module 720). Content-processing system 718 can include instructions for detecting, in a mapping table stored in a volatile memory, an error associated with the first logical block address, wherein the mapping table maps logical block addresses to physical block addresses (error-detecting module 722 and mapping table-managing module 724). Content-processing system 718 can include instructions for identifying a dedicated block which stores log entries with logical block addresses corresponding to sequentially programmed physical blocks (dedicated block-managing module 726). Content-processing system 718 can also include instructions for performing a search in the dedicated block to obtain a most recent valid log entry for the first logical block address (dedicated block-managing module 726). Content-processing system 718 can include instructions for obtaining a first physical block address corresponding to the first logical block address based on the sequentially programmed physical blocks (PBA-obtaining module 728). Content-processing system 718 can include instructions for executing the I/O request by accessing the first physical block address (request-executing module 732).

Content-processing system 718 can additionally include instructions for determining whether physical block addresses indicated in adjacent entries to the first entry in the mapping table are in a same superblock as the dedicated block (adjacency-determining module 730). Content-processing system 718 can include instructions for marking the adjacent entries as requiring recovery (adjacency-determining module 730).

Data 734 can include any data that is required as input or that is generated as output by the methods and/or processes described in this disclosure. Specifically, data 734 can store at least: data; a request; a read request; a write request; an input/output (I/O) request; data associated with a read request, a write request, or an I/O request; a mapping table; a logical block address; a physical block address; a logical-to-physical or L2P mapping table; a block of data; a superblock of data; a dedicated LBA block with a plurality of log entries; a dedicated block in a superblock; a log entry; an indicator of an error in an L2P mapping table; a most significant bit; a value of 0 or 1; an indicator of whether a physical block address adjacent to an entry in an L2P mapping table is in a same superblock as a dedicated LBA block for the entry; an indicator that an entry requires recovery; an invalidated log entry; a removed or deleted log entry; an updated log entry; a most recent valid log entry; an indicator of whether a memory cell stores one or two or more bits per cell; a plurality of data blocks storing data; a parity block which stores parity information for a plurality of data blocks in a same superblock; and a spare block.

Figure 8:
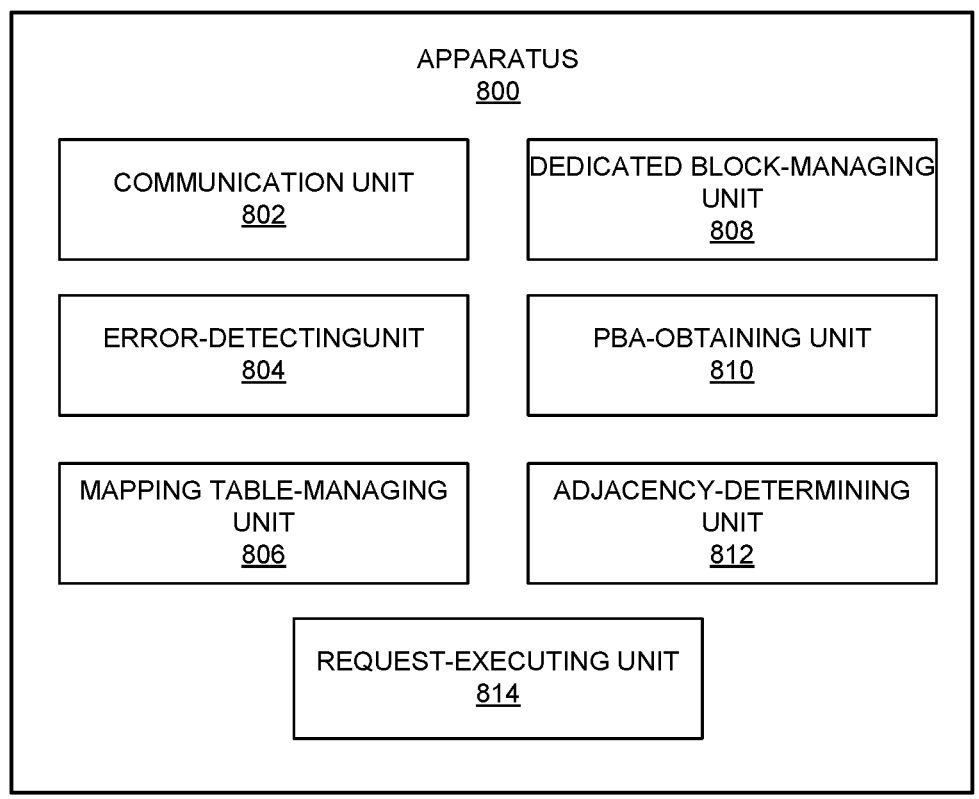
FIG. 8 illustrates an exemplary apparatus that facilitates error recovery of an L2P mapping table, in accordance with an embodiment of the present application.

FIG. 8 illustrates an exemplary apparatus 800 that facilitates error recovery of an L2P mapping table, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-814 which perform functions or operations similar to modules 720-732 of computer system 700 of FIG. 7, including: a communication unit 802; an error-detecting unit 804; a mapping table-managing unit 806; a dedicated block-managing unit 808; a PBA-obtaining 810; an adjacency-determining unit 812; and a request-executing unit 814.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating error recovery, the method comprising:
receiving an input/output request indicating data associated with a first logical block address;
detecting, in a mapping table stored in a memory, an error associated with the first logical block address, wherein the mapping table maps logical block addresses to physical block addresses;
identifying a dedicated block which stores log entries with logical block addresses corresponding to sequentially programmed physical blocks;
performing a search in the dedicated block for an earliest log entry and other log entries for the first logical block address, which comprises:
obtaining, based on the earliest log entry in the dedicated block for the first logical block address, an earliest physical block address corresponding to the first logical block address based on the sequentially programmed physical blocks; and
in response to obtaining no other log entries for the first logical block address, using the earliest physical block address as a first physical block address to be accessed in executing the I/O request;
determining the first physical block address corresponding to the first logical block address based on the sequentially programmed physical blocks; and
executing the I/O request by accessing the first physical block address.

2. The method of claim 1,
wherein a respective log entry for a respective logical block address in the dedicated block includes a bit indicating whether the respective logical block address is valid or invalid,
wherein a bit value of zero indicates that the respective logical block address is invalid, and wherein a bit value of one indicates that the respective logical block address is valid.

3. The method of claim 2, further comprising:
inserting, in the dedicated block, a first log entry with a bit value of one for the first logical block address, which indicates that the first logical block address is valid and that the first physical block address is valid;
inserting, in the dedicated block, a second log entry with a bit value of zero for the first logical block address, which indicates that the first logical block address is invalid and that the first physical block address is invalid; and
inserting, in the dedicated block, a third log entry with a bit value of one for the first logical block address, which indicates that the first logical block address has an updated corresponding physical block address.

4. The method of claim 2, further comprising:
identifying one or more log entries with the bit value set to zero; and
invalidating one or more logical block addresses of the identified one or more log entries.

5. The method of claim 1, wherein performing the search in the dedicated block for the earliest log entry and the other log entries for the first logical block address further comprises:
performing a search in the dedicated block to obtain the most recent valid log entry for the first logical block address.

6. The method of claim 5, wherein performing the search in the dedicated block for the earliest log entry and the other log entries further comprises:
in response to obtaining one or more other log entries, identifying the most recent valid log entry from the other log entries for the first logical block address.

7. The method of claim 1,
wherein detecting the error associated with the first logical block address further comprises detecting that the error is associated with a first entry in the mapping table, wherein the first entry indicates the first logical block address and the first physical block address, and
wherein the method further comprises:
determining that physical block addresses indicated in adjacent entries to the first entry in the mapping table are not in a same superblock as the dedicated block,
wherein the dedicated block stores log entries with logical block addresses corresponding to sequentially programmed physical blocks and includes one or more log entries for the first logical block address; and
marking the adjacent entries as requiring recovery.

8. The method of claim 7, further comprising:
determining that the physical block addresses indicated in the adjacent entries to the first entry in the mapping table are in the same superblock as the dedicated block; and
compacting the dedicated block by performing the search in the dedicated block to obtain the most recent valid log entry for the first logical block address.

9. The method of claim 1,
wherein the dedicated block comprises a memory element which stores one or two bits per cell,
wherein the dedicated block is part of a superblock which comprises a plurality of data blocks, a parity block which stores parity information for data stored in the data blocks, and the dedicated block, and
wherein the plurality of data blocks comprise the sequentially programmed physical blocks corresponding to the dedicated block.

10. A computer system for facilitating error recovery, the system comprising:
a processor; and
a memory coupled to the processor and storing instructions, which when executed by the processor cause the processor to perform a method, wherein the computer system is a storage device, the method comprising:
receiving an input/output request indicating data associated with a first logical block address;
detecting, in a mapping table stored in a memory, an error associated with the first logical block address, wherein the mapping table maps logical block addresses to physical block addresses;
identifying a dedicated block which stores log entries with logical block addresses corresponding to sequentially programmed physical blocks;
performing a search in the dedicated block for an earliest log entry and other log entries for the first logical block address, which comprises:
obtaining, based on the earliest log entry in the dedicated block for the first logical block address, an earliest physical block address corresponding to the first logical block address based on the sequentially programmed physical blocks; and
in response to obtaining no other log entries for the first logical block address, using the earliest physical block address as a first physical block address to be accessed in executing the I/O request;
determining the first physical block address corresponding to the first logical block address based on the sequentially programmed physical blocks; and
executing the I/O request by accessing the first physical block address.

11. The computer system of claim 10,
wherein a respective log entry for a respective logical block address in the dedicated block includes a bit indicating whether the respective logical block address is valid or invalid,
wherein a bit value of zero indicates that the respective logical block address is invalid, and
wherein a bit value of one indicates that the respective logical block address is valid.

12. The computer system of claim 11, wherein the method further comprises:
inserting, in the dedicated block, a first log entry with a bit value of one for the first logical block address, which indicates that the first logical block address is valid and that the first physical block address is valid;
inserting, in the dedicated block, a second log entry with a bit value of zero for the first logical block address, which indicates that the first logical block address is invalid and that the first physical block address is invalid; and
inserting, in the dedicated block, a third log entry with a bit value of one for the first logical block address, which indicates that the first logical block address has an updated corresponding physical block address.

13. The computer system of claim 11, wherein the method further comprises:
identifying one or more log entries with the bit value set to zero; and
invalidating one or more logical block addresses of the identified one or more log entries.

14. The computer system of claim 10, wherein performing the search in the dedicated block for the earliest log entry and the other log entries for the first logical block address further comprises:
 performing a search in the dedicated block to obtain the most recent valid log entry for the first logical block address.

15. The computer system of claim 14, wherein performing the search in the dedicated block for the earliest log entry and the other log entries further comprises:
 in response to obtaining one or more other log entries, identifying the most recent valid log entry from the other log entries for the first logical block address.

16. The computer system of claim 10,
 wherein detecting the error associated with the first logical block address further comprises detecting that the error is associated with a first entry in the mapping table, wherein the first entry indicates the first logical block address and the first physical block address, and
 wherein the method further comprises:
  determining that physical block addresses indicated in adjacent entries to the first entry in the mapping table are not in a same superblock as the dedicated block, wherein the dedicated block stores log entries with logical block addresses corresponding to sequentially programmed physical blocks and includes one or more log entries for the first logical block address; and
  marking the adjacent entries as requiring recovery.

17. The computer system of claim 16, wherein the method further comprises:
 determining that the physical block addresses indicated in the adjacent entries to the first entry in the mapping table are in the same superblock as the dedicated block; and
 compacting the dedicated block by performing the search in the dedicated block to obtain the most recent valid log entry for the first logical block address.

18. The computer system of claim 10,
 wherein the dedicated block comprises a memory element which stores one or two bits per cell,
 wherein the dedicated block is part of a superblock which comprises a plurality of data blocks, a parity block which stores parity information for data stored in the data blocks, and the dedicated block, and
 wherein the plurality of data blocks comprise the sequentially programmed physical blocks corresponding to the dedicated block.

* * * * *